(12) United States Patent
Otterstedt et al.

(10) Patent No.: US 9,136,553 B2
(45) Date of Patent: Sep. 15, 2015

(54) ELECTROLYTE FOR COST-EFFECTIVE, ELECTROLYTE-SUPPORTED HIGH-TEMPERATURE FUEL CELL HAVING HIGH PERFORMANCE AND HIGH MECHANICAL STRENGTH

(75) Inventors: Ralph Otterstedt, Goslar (DE); Joerg Laube, Laufenburg (DE); Marianne Gottschling, Goslar (DE); Michael Svec, Selb (DE)

(73) Assignee: SUNFIRE GMBH, Dresden (DE)

( * ) Notice: Subject to any disclaimer, the term of this patent is extended or adjusted under 35 U.S.C. 154(b) by 984 days.

(21) Appl. No.: 12/918,074

(22) PCT Filed: Jan. 20, 2009

(86) PCT No.: PCT/EP2009/050587
§ 371 (c)(1),
(2), (4) Date: Sep. 7, 2010

(87) PCT Pub. No.: WO2009/103580
PCT Pub. Date: Aug. 27, 2009

(65) Prior Publication Data
US 2011/0027690 A1    Feb. 3, 2011

(30) Foreign Application Priority Data

Feb. 19, 2008  (DE) .................. 10 2008 009 985

(51) Int. Cl.
*H01M 8/12* (2006.01)

(52) U.S. Cl.
CPC .... *H01M 8/1253* (2013.01); *H01M 2008/1293* (2013.01); *H01M 2300/0077* (2013.01); *Y02E 60/521* (2013.01); *Y02E 60/525* (2013.01)

(58) Field of Classification Search
CPC .............................................. H01M 2008/1293
USPC ......................................... 429/479, 495, 496
See application file for complete search history.

(56) References Cited

U.S. PATENT DOCUMENTS

| 4,205,051 A | 5/1980 | Takahashi et al. |
| 4,459,341 A | 7/1984 | Marchant et al. |
| 5,376,473 A | 12/1994 | Akagi |
| 5,709,786 A | 1/1998 | Friese et al. |
| 6,280,868 B1 | 8/2001 | Badwal et al. |

(Continued)

FOREIGN PATENT DOCUMENTS

| DE | 28 37 593 | 4/1979 |
| DE | 3403608 A1 | 8/1984 |

(Continued)

OTHER PUBLICATIONS

Electrical conductivity of stabilized zirconia wity ytterbia and scandia, Osamu Yamamoto et al., Solid State Ionics 79 (1995), p. 137-142.*

(Continued)

*Primary Examiner* — Ula C Ruddock
*Assistant Examiner* — Thomas Parsons
(74) *Attorney, Agent, or Firm* — Norman B. Thot

(57) ABSTRACT

Electrolyte for an electrolyte-supported high-temperature fuel cell includes zirconium(IV) oxide doped with from 3.5 mol % to 6.5 mol % of ytterbium(III) oxide. The electrolyte has a thermal expansion coefficient (TEC) based on 30° C. of from $10.6*10^{-6}$ $K^{-1}$ to $11.1*10^{-6}$ $K^{-1}$ at 800° C.

12 Claims, 10 Drawing Sheets

(56) References Cited

U.S. PATENT DOCUMENTS

| | | | |
|---|---|---|---|
| 6,294,128 B1 * | 9/2001 | Crosbie | 264/618 |
| 6,737,186 B2 | 5/2004 | Janousek et al. | |
| 8,333,919 B2 * | 12/2012 | Couse | 264/618 |
| 2002/0182468 A1 * | 12/2002 | Janousek et al. | 429/30 |
| 2003/0224240 A1 | 12/2003 | Yamashita et al. | |
| 2005/0019636 A1 | 1/2005 | Kwon et al. | |
| 2009/0047562 A1 | 2/2009 | Hata et al. | |
| 2010/0233579 A1 * | 9/2010 | Laube et al. | 429/496 |

FOREIGN PATENT DOCUMENTS

| | | |
|---|---|---|
| DE | 693 14 733 T2 | 3/1994 |
| DE | 197 82 271 T1 | 4/2000 |
| DE | 103 24 396 A1 | 12/2004 |
| EP | 1 598 892 A1 | 11/2005 |
| EP | 1 829 824 A1 | 9/2007 |
| JP | 2000-506671 A | 5/2000 |
| JP | 2007-502012 A | 2/2007 |
| WO | WO 94/11322 | 5/1994 |
| WO | WO 98/49738 | 11/1998 |
| WO | WO 02/35634 A1 | 5/2002 |
| WO | WO 2007/013567 A1 | 2/2007 |
| WO | WO 2008/019926 A1 | 2/2008 |

OTHER PUBLICATIONS

Electrical conductivity of polycrystalline tetragonal zirconia $ZrO_2$—$M_2O_3$ (M=Sc, Y, Yb), O. Yamamoto et al., Journal of Materials Science Letters, 8 (1989), p. 198-200.

Electrical conductivity of stabilized zirconia with ytterbia and scandia, Osamu Yamamoto et al., Solid State Ionics 79 (1995), p. 137-142.

Study on zirconia solid electrolytes doped by complex additives, Z.G. Lv et al., Materials Science and Engineering A, 458 (2007), p. 355-360.

Electrical conductivity in the $ZrO_2$-rich region of Serveral $M_2O_3$—$ZrO_2$ Systems, D. W.Strickler et al, Journal of the American Ceramic Society, vol. 48 (1965) No. 6, p. 286-289.

Properties of YSZ thin film deposited by e-beam technique, G. Laukaitis et al., Solid State Ionics, 179 (2008), pp. 182-187.

DIN EN 1288-2 (Sep. 1986), 22 pgs.

* cited by examiner

Fig. 1: Measurement of the thermal expansion coefficients
Measurement conditions: the starting length was about 10/20 mm.
Dimensions: 1/3 mm x 3 mm;
Temperature profile: room temperature -> 2 K -> 870°C -> 5 K -> room temperature;
Argon; reference temperature: 30°C Fig. 2: Conversion of the strength of the YbSZ strips to the standard volume of 1 mm³ and to other specimen sizes Electron micrograph of a thermally etched polished section of a sintered electrolyte layer containing 5YbSZ $T_{max}$ = 1400°C
Hold time = 180 min
Rate = 60 K/h At least 98% of the grains are smaller than 2.0 μm Electron micrograph of a thermally etched polished section of a sintered electrolyte layer containing 5YbSZ $T_{max}$ = 1410°C
Hold time = 156 min
Rate = 60 K/h At least 98% of the grains are smaller than 1.6 μm Electron micrograph of a thermally etched polished section of a sintered electrolyte layer containing 5YbSZ $T_{max}$ = 1400°C
Hold time = 120 min
Rate = 60 K/h At least 98% of the grains are smaller than 1.3 μm H-5Yb-F-070809 Spec. 13, 10kV, 8mm, 5000x Electron micrograph of a thermally etched polished section of a sintered electrolyte layer containing 5YbSZ $T_{max}$ = 1425°C
Hold time = 120 min
Rate = 60 K/h At least 98% of the grains are smaller than 1.9 μm Electron micrograph of a thermally etched polished section of a sintered electrolyte layer containing 5YbSZ $T_{max}$ = 1425°C
Hold time = 180 min
Rate = 60 K/h At least 98% of the grains are smaller than 1.6 μm

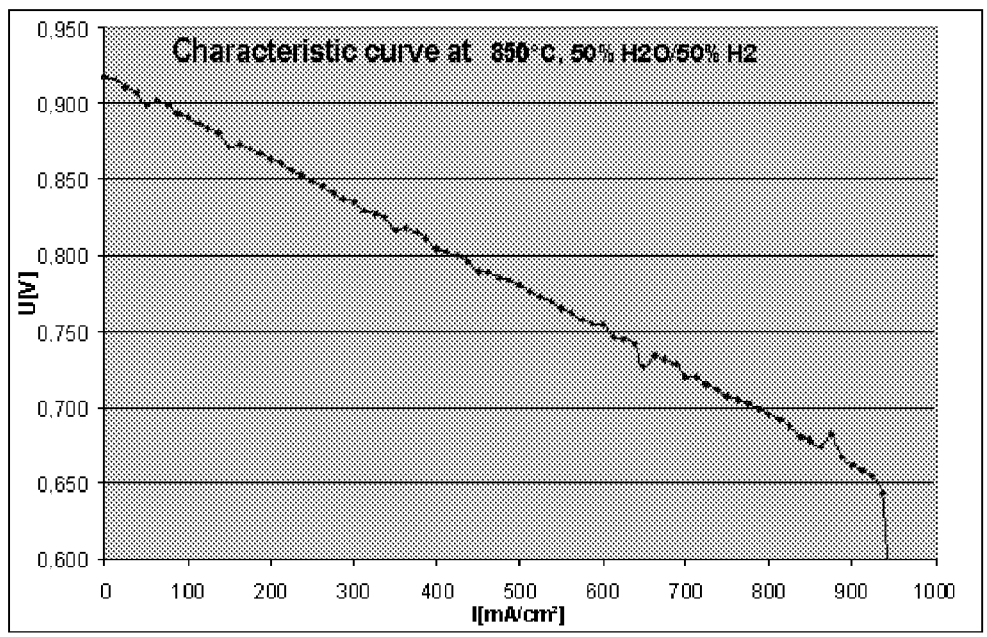
Fig. 8 (Example 1)
U-I curve for cell with electrolyte 75 μm 6YbSZ, 1200°C cosintering; ASR=0.28 Ωcm$^2$; ASR = area specific resistance
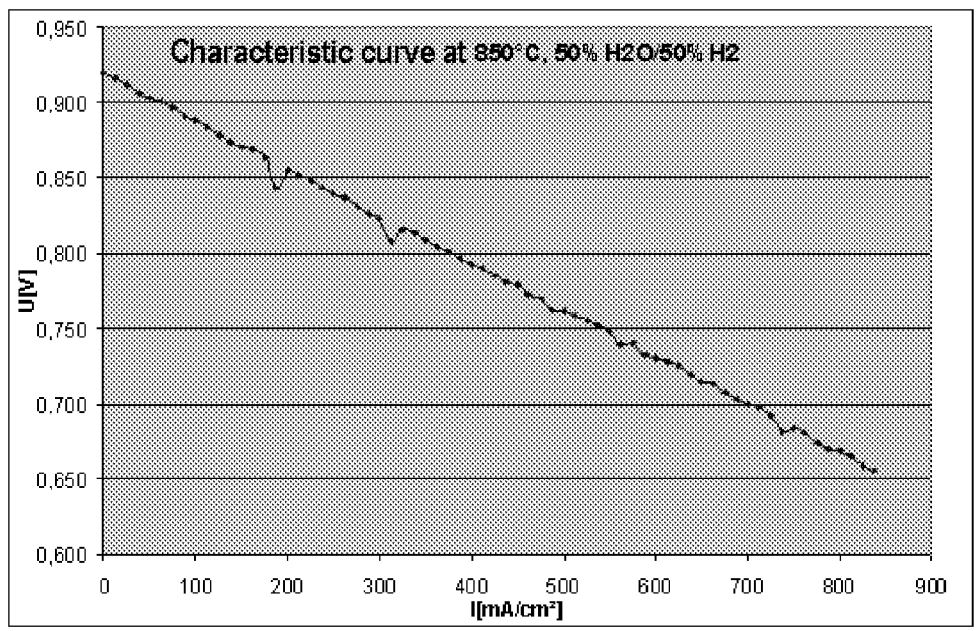
Fig. 9 (Example 2)
U-I curve for cell with electrolyte 54 μm 4YbSZ, 1200°C cosintering; ASR=0.31 Ωcm$^2$

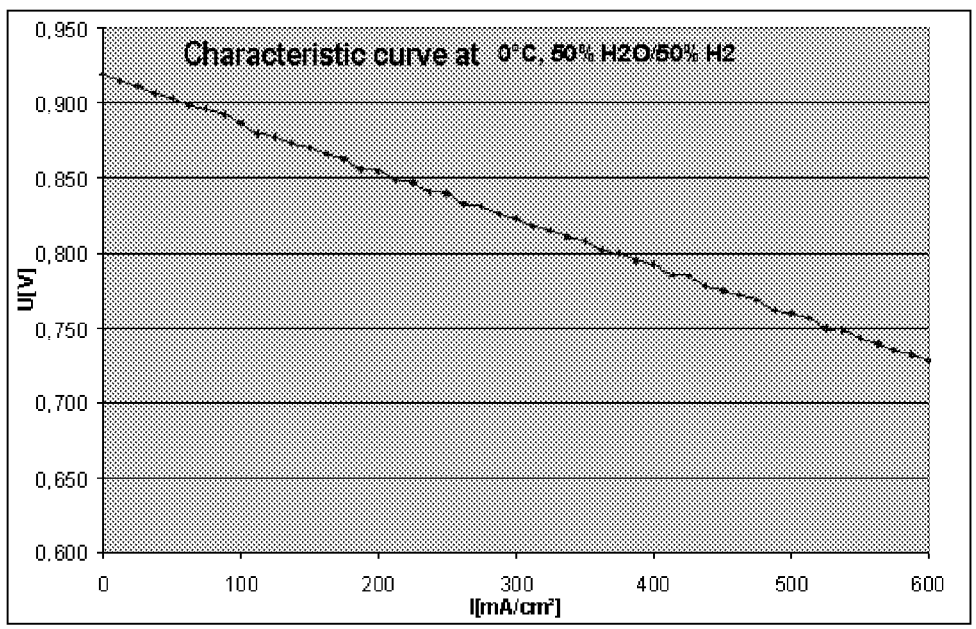
Fig. 10 (Example 3)
U-I curve for cell with electrolyte 89 μm 5YbSZ, 1200°C cosintering; ASR=0.32 Ωcm$^2$
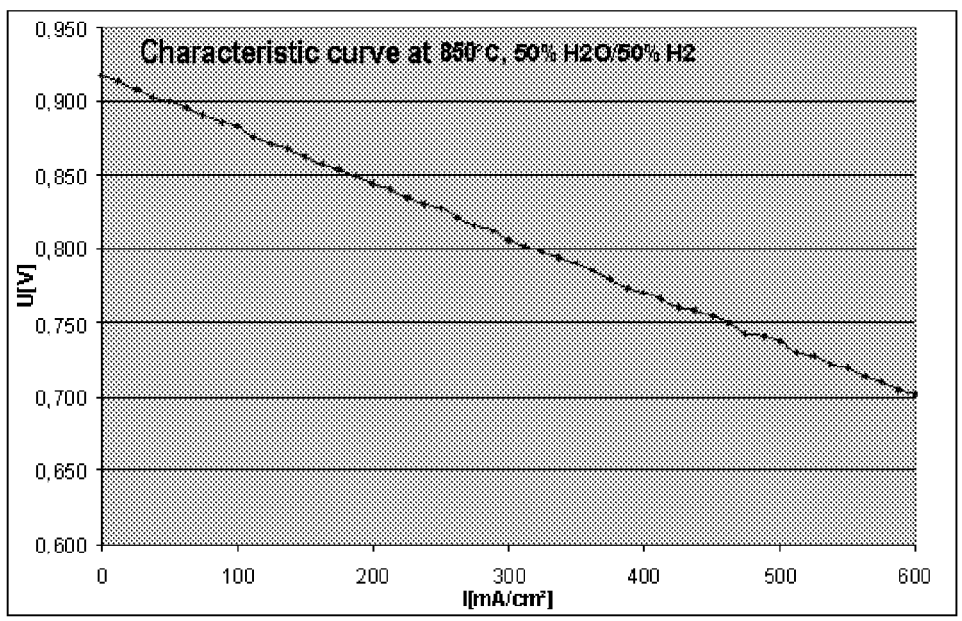
Fig. 11 (Example 4)
U-I curve for cell with electrolyte 91 μm 5YbSZ, 1250°C cosintering; ASR=0.36 Ωcm$^2$

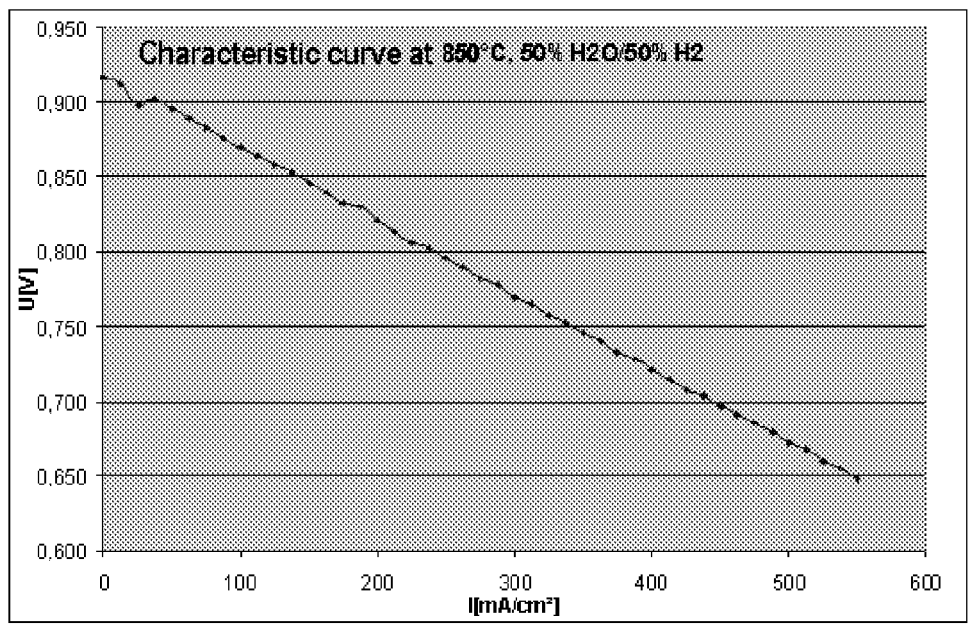
Fig. 12 (Prior Art - Comparative Example 1)
U-I curve for comparative cell with electrolyte 90 μm 3YSZ, 1200°C cosintering; ASR=0.49 Ωcm$^2$
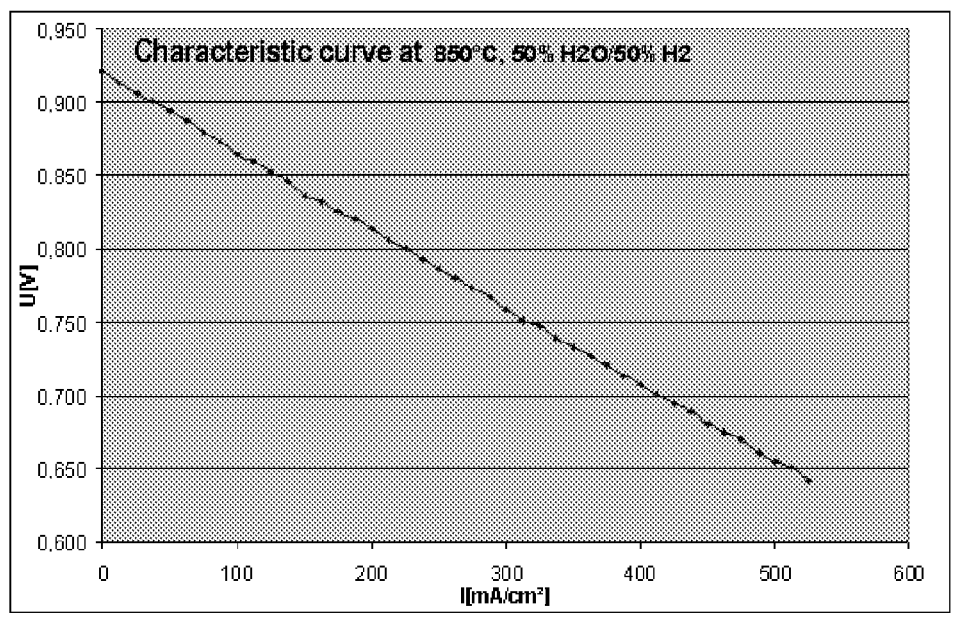
Fig. 13 (Prior Art - Comparative Example 2)
U-I curve for comparative cell with electrolyte 90 μm 3YSZ, 1250°C cosintering; ASR=0.54 Ωcm$^2$

ELECTROLYTE FOR COST-EFFECTIVE, ELECTROLYTE-SUPPORTED HIGH-TEMPERATURE FUEL CELL HAVING HIGH PERFORMANCE AND HIGH MECHANICAL STRENGTH

CROSS REFERENCE TO PRIOR APPLICATIONS

This application is a U.S. National Phase application under 35 U.S.C. §371 of International Application No. PCT/EP2009/050587, filed on Jan. 20, 2009 and which claims benefit to German Patent Application No. 10 2008 009 985.6, filed on Feb. 19, 2008. The International Application was published in German on Aug. 27, 2009 as WO 2009/103580 A1 under PCT Article 21(2).

BACKGROUND

One motivation for the development of electrolyte-supported fuel cells having high power and high mechanical strength is their use for stationary and mobile power generation, for example, in road vehicles, in spaceflight, in combination with $H_2$ stores (for example metal hydrides), as power stations in the megawatt range for peak loads, and as power-heating systems in the field of domestic energy.

The present invention falls within the technical field of high-temperature fuel cells. Fuel cells are electrochemical cells which convert chemical energy directly into electric energy with high efficiency. In contrast to conventional power station and turbine technology, fuel cell technology offers a high electric energy efficiency even in small plants in the range 0.1-1000 kW.

The most common chemical reaction utilized in fuel cells is the reaction between hydrogen and oxygen. Compared to low-temperature fuel cells (for example, polymer electrolyte membrane fuel cells), high-temperature fuel cells offer the advantage that, with appropriate catalytic activity of the anode, they can convert not only hydrogen but also carbon monoxide and/or methane and higher hydrocarbons, either directly or if appropriate after simple reforming using water or atmospheric oxygen, to give hydrogen- and carbon monoxide-rich fuel gas into electric energy.

In high-temperature fuel cells, separation of anode and cathode reactions which is typical of electrochemical energy converters such as batteries and fuel cells occurs by means of a ceramic membrane, namely the electrolyte, which has to be electronically insulating but conductive for hydrogen ions or oxygen ions. The present invention provides an electrolyte for a high-temperature fuel cell which is based on oxygen ion conductors, namely a solid oxide electrolyte, and an electrolyte-supported solid oxide fuel cell (SOFC=solid oxide fuel cell) which is based on this electrolyte and can be obtained by applying an anode which is electrocatalytically active for the oxidation of hydrogen and a cathode which is electrocatalytically active for the reduction of oxygen to the electrolyte which conducts oxygen ions.

A single high-temperature fuel cell produces a maximum open-circuit or zero-load voltage of about 1 volt, so that a plurality of individual cells have to be connected in series (for example, anode to cathode or bipolar), i.e., stacked, in order to produce voltages of 12 V and more which are usable in energy generation. Interconnects, also referred to as bipolar plates, are inserted between the individual cells of a fuel cell stack so as to provide, inter alia, the necessary separation of gas spaces of anode and cathode and to connect the cells firmly in an electrically conductive manner so as to make flow of current through the cell stack possible. For cost reasons, and also for reasons of operability (heating behaviour, thermal mass), the use of 0.2-0.5 mm thick, metallic bipolar plate materials is desirable. The choice of the metallic material is restricted by many requirements (including corrosion resistance, electrical conductivity of the passive layer and matching of the thermal expansion behaviour to the ceramic cell).

Known, suitable metallic materials are ferritic steels produced by melt metallurgy, such as Crofer® 22 APU from ThyssenKruppVDM, Fe—Cr alloys produced by powder metallurgy, such as the ITM alloys from Plansee, or Cr—Fe-based alloys produced by powder metallurgy, such as Ducrolloy from Plansee. The latter have the disadvantage that plate sizes as are typically required for bipolar plates cannot be produced with a thickness of less than 1.5 mm by the production technology of the prior art; the advantage is that they are corrosion resistant and mechanically strong even at 950° C. The ferritic alloys can advantageously be processed to produce thin sheets having a thickness of typically 0.3-0.5 mm; however, they have the disadvantage that they are corrosion resistant only to a maximum of 850° C.

CrFe-based alloys comprise predominantly chromium (for example 95% chromium, 5% iron for the material of Siemens/Plansee). The CrFe-based alloys can only be produced by powder metallurgy; they are shaped by pressing of the powder and cannot be machined by cutting machining nor be shaped by cold forming (for example, by bending, deep drawing, etc.) since they are too brittle.

Ferritic Fe—Cr alloys (having a maximum chromium content of 25%) can be produced by melt metallurgy like steel (for example by vacuum melting) and can therefore be rolled into sheets, machined by cutting machining and shaped by cold forming.

As an alternative to melt-metallurgical production, the ferritic Fe—Cr alloys can also be produced by powder metallurgy, such as by pressing and sintering. They then have similar properties to ferritic steels produced by melt metallurgy; however, due to the method of production they are not steels.

Fe—Cr alloys produced both by melt metallurgy and powder metallurgy which are suitable as materials for SOFC bipolar plates are characterized by a thermal expansion coefficient (TEC; all values reported below are at a reference temperature of 30° C.) in the range $11.8\text{-}12.2 * 10^{-6}$ $K^{-1}$ at 800° C. and $10.6\text{-}10.7 * 10^{-6}$ $K^{-1}$ at 200° C. CrFe-based alloys have a thermal expansion coefficient of $10.1 * 10^{-6}$ $K^{-1}$ at 800° C. and of $8.9 * 10^{-6}$ $K^{-1}$ at 200° C. Owing to the necessity of obtaining a firm bond between bipolar plate and ceramic cell, a very small difference between the thermal expansion coefficients of bipolar plate and ceramic cell is desirable.

Ceramic fuel cells can be divided roughly into the types electrolyte-, cathode-, anode- and third material-supported cells. In addition, a distinction in geometric terms is made between tubular and planar cells.

In the case of electrolyte-supported cells, the electrolyte thickness has to be at least 50-150 µm, depending on the strength of the electrolyte material and the size of the cell. Anode and cathode have, depending on structure and material, a layer thickness of 20-100 µm. In the case of cathode-supported cells, the cathode material, usually lanthanum-strontium-manganese oxide, is configured as a porous support having a thickness of about 1 mm; a thin cathode functional layer may be present on the support and a 5-15 µm thick electrolyte layer followed by a 20-100 µm thick anode layer are present thereon. In the case of anode-supported cells, the anode material, usually a cermet of nickel and (partially) stabilized zirconium(IV) oxide, is configured as a porous support having a thickness of 0.2-1.5 mm. A thin anode functional layer may be present on this and a 5-15 μm thick electrolyte layer followed by a 20-100 μm thick cathode layer are present thereon. In the case of third material-supported cells, the porous support material for the structure comprising the anode, the 5-15 μm thick electrolyte and the cathode comprises corrosion-resistant metal or inert ceramic.

The supporting material essentially determines the thermal expansion behaviour. The abbreviations of the general type "number-element-SZ" used here can be explained as follows: the number indicates the doping of the material in mol percent; the element indicates the doping element or the oxide thereof; SZ is stabilized zirconium(IV) oxide. For example, 3YSZ is a zirconium(IV) oxide doped with 3 mol % of yttrium(III) oxide; 10ScSZ is a zirconium(IV) oxide doped with 10 mol % of scandium(III) oxide; and 5YbSZ is a zirconium (IV) oxide doped with 5 mol % of ytterbium(III) oxide. Electrolytes composed of 3YSZ (zirconium(IV) oxide stabilized with 3 mol % of yttrium(III) oxide) of electrolyte-supported cells have a TEC of about $10.9*10^{-6}$ $K^{-1}$ at 800° C. and of about $10.4*10^{-6}$ $K^{-1}$ at 200° C. Electrolytes based on 8YSZ (zirconium(IV) oxide stabilized with 8 mol % of yttrium(III) oxide) have a TEC of about $10.1*10^{-6}$ $K^{-1}$ at 800° C. and of about $8.8-9.2*10^{-6}$ $K^{-1}$ at 200° C.

Anode-supported cells based on Ni/YSZ have a TEC of about $12-13*10^{-6}$ $K^{-1}$. It is known that anode-supported cells harmonize with ferritic alloys, while electrolyte-supported cells based on 8YSZ (and also 10ScSZ) are, according to the prior art, used together with Cr—Fe-based alloys.

Although anode-supported cells offer very high power densities at as low as 700-800° C., they have the disadvantage that they are not mechanically stable to repeated anode-side oxidation and reduction. This behaviour forces the developer of the system to ensure that there is not an oxidizing atmosphere on the anode side, which incurs increased system costs and restricts the type of fuel gas production to steam reforming; this is generally undesirable for mobile systems and represents a restriction in the case of small stationary systems. The electrolyte-supported cells based on 8YSZ or 10ScSZ display high power densities at temperatures above 800-900° C. and can be exposed to repeated oxidation and reduction cycles on the anode side, but they have the disadvantage of a comparatively low mechanical strength which forces electrolyte thicknesses of 150 microns and more and particularly good matching of the TECs of interconnect and cell and thus the use of the thick and correspondingly expensive interconnects composed of CrFe-based alloys; otherwise, the cells break during heating and/or cooling of the fuel cell stack.

Electrolyte supported cells based on zirconium(IV) oxide doped with scandium(III) oxide (ScSZ) offer the highest power density but are disproportionately expensive in mass production because of the extremely high price of scandium (III) oxide (about 100× as high as yttrium(III) oxide, based on the molar amount), which is, inter alia, a consequence of the lack of deposits.

The combination of electrolyte-supported cells based on high-strength 3YSZ both with CrFe-based alloys (from Sulzer Hexis) and with ferritic Fe—Cr alloys (from Staxera), which are particularly inexpensive and therefore advantageous, has therefore been tested in the search for a technically simple and robust system. The differences in the TEC between interconnector and electrolyte which occur are compensated by weight or clamping forces applied to the fuel cell stack so that the high-strength, 3YSZ-based cells accommodate the mechanical stresses which occur. The disadvantage of 3YSZ-based electrolyte-supported cells is that, owing to the relatively low ionic conductivity of 3YSZ of about 2.5 S/m at 850° C., the power density of the cell is significantly lower than in the case of 8YSZ (about 8 S/m at 850° C.) or 10-11ScSZ (about 20 S/m at 850° C.) or in the case of anode-supported cells even when using relatively thin 3YSZ electrolytes (90 μm 3YSZ compared to 150 μm 8YSZ or 10 ScSZ) and larger and consequently more expensive stacks are therefore necessary to achieve a particular power.

SUMMARY

An aspect of the present invention is to provide an electrolyte for an electrolyte-supported cell which, in the working temperature range of ferritic iron-chromium steels or alloys having a chromium content of about 20-25%, i.e., at 800-900° C., has the following features:

The electrolyte of the present invention for a fuel cell according to the present invention should make it possible to achieve a significantly higher power density than in the case of fuel cells which have a 90 μm thick, 3YSZ-based electrolyte. At an operating temperature of 850° C., a cell having a 90 μm thick electrolyte composed of 3YSZ has, depending on the firing temperature for the electrodes, an area resistance of 0.49-0.54 Ω$cm^2$, which at an operating voltage of 700 mV in a fuel gas mixture of hydrogen and water in a molar ratio of 1:1 makes a power density of about 315 or about 290 mW/$cm^2$ possible.

The electrolyte-supported fuel cell resting on the electrolyte of the present invention should have a thermal expansion coefficient similar to a 3YSZ-based electrolyte-supported cell, i.e. a thermal expansion coefficient (TEC) based on 30° C. in the range from $10.6*10^{-6}$ $K^{-1}$ to $11.2*10^{-6}$ $K^{-1}$ at 800° C., for example, in the range from $10.7*10^{-6}$ $K^{-1}$ to $11.1*10^{-6}$ $K^{-1}$ such as in the range from $10.8*10^{-6}$ $K^{-1}$ to $11.0*10^{-6}$ $K^{-1}$, so that very low compressive and tensile stresses occur during cooling of fuel cell stacks having interconnects made of ferritic steel and the electrolyte material is not damaged during processing and during operation of the fuel cell. In general, the electrolyte material should be able to be used with interconnects which have a thermal expansion coefficient in the range $11.5-12.5*10^{-6}$ $K^{-1}$.

The electrolyte of the present invention should have a significantly higher mechanical strength than 8YSZ and 10ScSZ electrolytes, for example, it should have a mechanical strength of more than 700 MPa, more than 800 MPa, or more than 900 MPa, when the mechanical strength is determined by the double ring measurement method of the standard EN 1288-2. Alternatively, the electrolyte layer should have a mechanical strength of more than 800 MPa, for example, more than 1000 MPa, or more than 1200 MPa, when the mechanical strength is determined by the cylinder bend fracture test, based on the volume under tension of an electrolyte strip having dimensions of 50 mm×7.7 mm×0.090 mm, so that electrolyte thicknesses similar to or only slightly above 90 μm, i.e. in the range from 50 to 150 μm, for example, from 70 to 120 μm, can be used in the fuel cell stack.

An alternative, additional aspect of the present invention is that the electrolyte should not be substantially more expensive than 3YSZ- or 8YSZ-based electrolytes for electrolyte-supported cells.

To be able to operate the fuel cells under the above conditions, cells having a high electric power per unit area, in particular a power of more than 400 mW/$cm^2$ at 850° C., and having a high electric power per cell volume are required. Inexpensive fuel cell systems are also characterized in that the interconnects of the fuel cell stack are made of thin sheets of ferritic steel and in that no auxiliary facilities to provide inert conditions so as to prevent oxidation of the anode are used in the system. These two requirements, namely a high power and mechanical strength, can be realized only by means of cells having sufficient mechanical strength which in the case of reoxidation of the anode by air fed in or entering during operation of the fuel cell remain mechanically stable on the anode side and are able to have their electrochemical performance completely restored after renewed reduction of the anode.

In an embodiment, the present invention provides an electrolyte for an electrolyte-supported high-temperature fuel cell which includes zirconium(IV) oxide doped with from 3.5 mol % to 6.5 mol % of ytterbium(III) oxide. The electrolyte has a thermal expansion coefficient (TEC) based on 30° C. of from $10.6*10^{-6}$ K$^{-1}$ to $11.1*10^{-6}$ K$^{-1}$ at 800° C.

BRIEF DESCRIPTION OF THE FIGURES

The present invention is described in greater detail below on the basis of embodiments and of the drawings in which:

FIG. 8 shows the Example 1 U-I curve for a cell with electrolyte 75 μm 6YbSZ;

FIG. 9 shows the Example 2 U-I curve for a cell with electrolyte 54 μm 4YbSZ;

FIG. 10 shows the Example 3 U-I curve for a cell with electrolyte 89 μm 5YbSZ;

FIG. 11 shows the Example 4 U-I curve for a cell with electrolyte 91 μm 5YbSZ;

FIG. 12 shows the Comparative Example 1 U-I curve for a comparative cell with electrolyte 90 μm 3YbSZ; and FIG. 13 shows the Comparative Example 2 U-I curve for a comparative cell with electrolyte 90 μm 3YbSZ.

DETAILED DESCRIPTION

In an embodiment, the present invention provides an electrolyte which comprises a zirconium(IV) oxide (=$ZrO_2$) doped with ytterbium(III) oxide (=$Yb_2O_3$), where the proportion of ytterbium(III) oxide is from 3.5 to 6.5 mol %, for example, from 4 to 6 mol %, from 4.25 to 5.75 mol %, from 4.5 to 5.5 mol %, from 4.8 to 5.2 mol %, or 5 mol %, in each case based on the zirconium(IV) oxide. An electrolyte-supported fuel cell which has the required cell power can be produced on the basis of the electrolyte of the invention.

In an embodiment, the properties of the electrolyte material in terms of the thermal expansion coefficient and the mechanical strength are realized by the present invention providing a sintering process for the electrolyte material, in which, for example, the sintering temperature, the hold time for which the material is held at the sintering temperature and the rate of temperature increase are important factors. When the conditions provided for in the present invention are adhered to, then the sintered density sought, the specific conductivity, i.e., the power, and the required mechanical strength are obtained. Use of the inexpensive ytterbium(III) oxide also enables the production costs to be reduced compared with scandium(III) oxide.

The electrolyte according to the present invention of a fuel cells comprises a zirconium(IV) oxide (=$ZrO_2$) doped with ytterbium(III) oxide (=$Yb_2O_3$), where the proportion of ytterbium(III) oxide is from 3.5 to 6.5 mol %, for example, from 4 to 6 mol %, or from 4.25 to 5.75 mol %, from 4.6 to 5.5 mol %, from 4.8 to 5.2 mol %, or 5 mol %, in each case based on the zirconium(IV) oxide.

Figure 1:
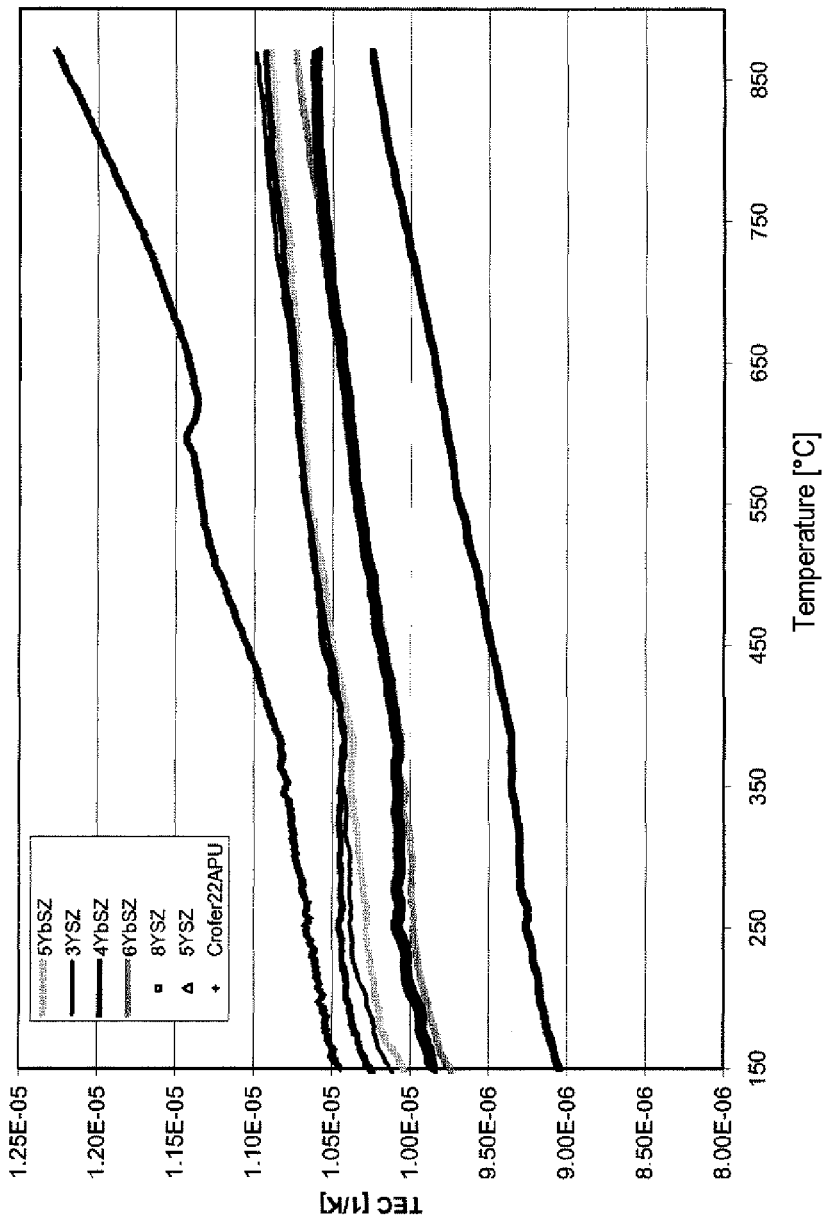
FIG. 1 shows the measurement of thermal expansion coefficients TEC as a function of the final temperature.
Figure 2:
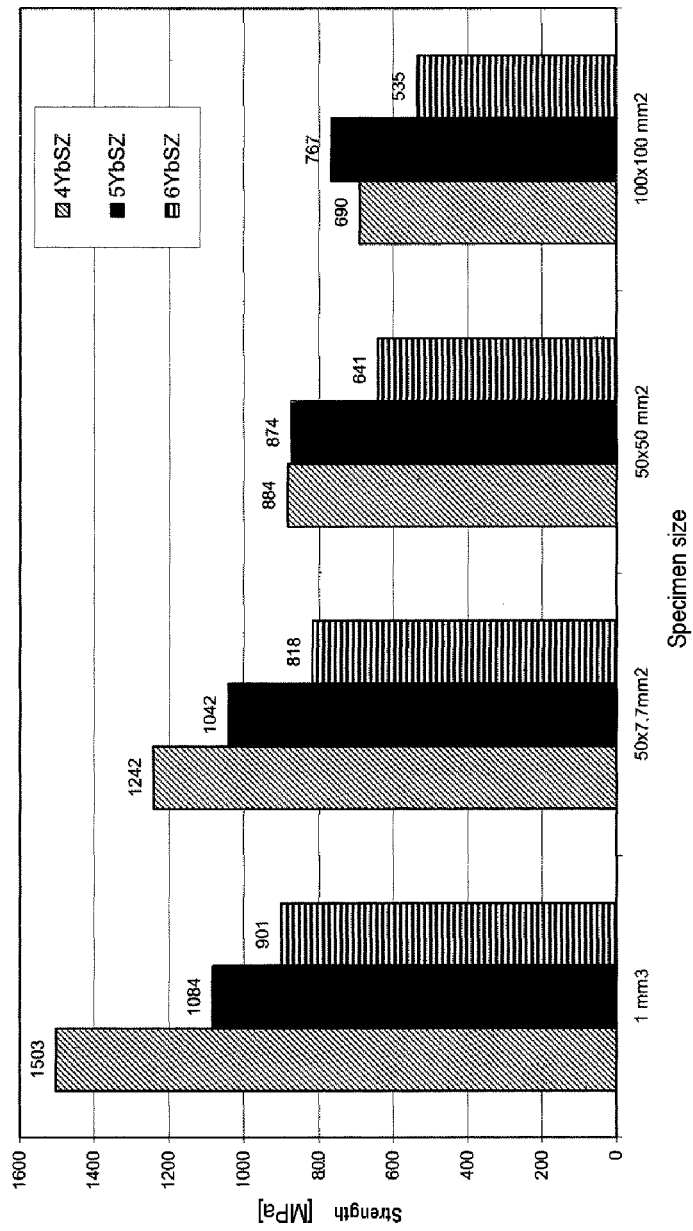
FIG. 2 shows the conversion of the strength of the YbSZ strips to the standard volume of 1 mm$^3$ and to other specimen sizes.

To allow satisfactory processing with the interconnects composed of ferritic steel and trouble-free operation, the thermal expansion coefficient based on 30° C. of the electrolyte (TEC) at 800° C. should be in the range from $10.6*10^{-6}$ K$^{-1}$ to $11.2*10^{-6}$ K$^{-1}$, for example, in the range from $10.7*10^{-6}$ K$^{-1}$ to $11.1*10^{-6}$ K$^{-1}$ or in the range from $10.8*10^{-6}$ K$^{-1}$ to $11.0*10^{-6}$ K$^{-1}$. In general, the "technical" thermal expansion coefficient with reference temperature T1 and final temperature T2 can be defined as follows: TEC (T1,T2)=[1/L(T1)]* [L(T2)−L(T1)]/[T2−T1], where L(T1) is the length of the specimen at the reference temperature T1 and L(T2) is the length of the specimen at the final temperature T2. In FIG. 1, this TEC is shown as a function of the final temperature T2. The thickness of the electrolyte layer is in the range from 50 to 150 μm, for example, in the range from 70 to 120 μm such as in the range from 90 to 100 μm.

It has been found that an optimal mechanical strength of the electrolyte layer is obtained when, at a doping of the zirconium(IV) oxide with from 4.6 to 5.5 mol % of $Yb_2O_3$, for example, with from 4.8 to 5.2 mol % of $Yb_2O_3$, optionally at least 98% of the grains have a visible diameter in the electron micrograph of less than or equal to 2.0 μm, for example, less than or equal to 1.6 μm or less than or equal to 1.3 μm (see FIGS. 3 to 7). The term "visible diameter in the electron micrograph" is, in this context, to be understood as follows: the 5 or 6 largest visible grain diameters were selected from the about 1000-2000 visible grain diameters in a 20 μ×25 μm section of an electron micrograph of a thermally etched polished section and the diameter was measured. Here, the size given for "less than" is selected so that none of the visible grain diameters is above the limit indicated. The actual diameter of the grains is also slightly different from the visible diameter of the grains in the electron micrograph since in a thermally etched polished section for an electron micrograph the grains are not always cut along the greatest diameter; conversely, more than 1000 grains have been cut without a single grain having a diameter above the limit indicated having become visible.

The mechanical strength of the electrolyte layer is more than 700 MPa, for example, more than 800 MPa or more than 900 MPa, when the mechanical strength is determined by the double ring measurement method of the standard EN 1288-2. Alternatively, the mechanical strength can be determined by the cylinder bend fracture test which is based on the volume under tension of an electrolyte strip having dimensions of 50 mm×7.7 mm×0.090 mm; in this case, the values for the mechanical strength are above 800 MPa, for example, above 1000 MPa or above 1200 MPa. In the test according to the latter method, the thickness of the test specimen is from about 90 to 95 μm, of which one half is under tension and the other half is under compression during bending. As reference volume for determination of the strength, only the part under tension, i.e. arithmetically precisely 45-47.5 μm, is to be taken into account.

The area specific cell resistance, expressed in Ωcm$^2$, (ohm*square centimeter), referred to as ASR=area specific resistance, is made up of a contribution from the electrodes and a contribution from the electrolyte. A high ASR is equivalent to a low cell power per unit area in Wcm$^{-2}$ or 0.7 VAcm$^{-2}$ at a given working voltage of 0.7 V, and vice versa. A very low contribution of the electrolyte to the area specific cell resistance, ASR, as a result of a production-related optimized effectiveness of the dopant used is obtained when the ratio of conductivity, measured in S/m at 850° C., to concentration of the dopant in mol % has a value of greater than or equal to 1.0 S/(m mol %), for example, greater than or equal to 1.05 S/(m mol %) or greater than or equal to 1.075 S/(m mol %).

A cell produced using an electrolyte according to the present invention has a specific area resistance at 850° C. of less than or equal to 0.4 $\Omega cm^2$, for example, less than or equal to 0.36 $\Omega cm^2$ or less than or equal to 0.32 $\Omega cm^2$.

The use according to the present invention of ytterbium (III) oxide as dopant for zirconium(IV) oxide with comparable or better properties of the cell represents an inexpensive alternative to the expensive scandium(III) oxide which has been used hitherto; the price of scandium(III) oxide is about 65 times the price of ytterbium(III) oxide. The use of the expensive scandium(III) oxide can thus be dispensed with.

The thickness of the electrolyte layer has an influence on the mechanical stability, for example, on the absolute force needed to break the layer. It also has an influence on the mechanical stress in the stack, which is temperature-dependent. At high temperature, the stress of the ceramic is decisive since the steel deforms plastically at high temperatures; at low temperatures, the steel contracts more strongly than the ceramic because of its higher thermal expansion coefficient and the stress of the steel is therefore decisive. Finally, the thickness influences the resistance in that the conductivity or the power become greater the thinner the electrolyte layer; however, if the electrolyte layer is made thin, this is at the expense of mechanical stability. The thickness of the electrolyte layer can, for example, be 50-150 μm, such as 70-120 μm, and is optimized for interconnects composed of ferritic steel.

In an embodiment, the fuel cell which can be produced from the electrolyte of the present invention further comprises an anode and a cathode which are described in detail below.

The anode of the electrolyte-supported fuel cell of the present invention comprises three layers.

The first layer of the anode is a thin bonding layer. This bonding layer comprises cerium oxide which is doped with gadolinium(III) oxide and is provided with cobalt oxide. The proportion of gadolinium(III) oxide (=$Gd_2O_3$) in the thin bonding layer is 5-25 mol %, for example, from 15 to <20 mol %, based on the cerium oxide. The proportion of cobalt oxide in the thin bonding layer of cerium oxide is 1-2% by weight, based on the cerium oxide. The thickness of this first bonding layer of cerium oxide is in the range 1-5 μm, for example, in the range 2-4 μm.

The second layer of the anode is an electrochemically active functional layer. It can comprise a mixture of nickel(II) oxide and cerium oxide, with the cerium oxide being doped with gadolinium(III) oxide. In the mixture of nickel(II) oxide and cerium oxide, the proportion of nickel(II) oxide is in the range 50-70% by weight, based on the total weight of the mixture. The thickness of the second layer of the anode is 10-40 μm, for example, 15-30 μm.

As an alternative, a mixture of nickel(II) oxide with zirconium(IV) oxide can be used as an electrochemically active anode layer. In this case, the zirconium(IV) oxide is doped with from 8 to 10 mol % of yttrium(III) oxide, based on the zirconium(IV) oxide. A further alternative for the electrochemically active anode layer is a mixture of nickel(II) oxide and zirconium(IV) oxide, with the zirconium(IV) oxide being doped with from 7 to 10 mol % of ytterbium(III) oxide, based on the zirconium(IV) oxide. The proportion of nickel(II) oxide is in both cases in the range from 50 to 70% by weight. The thickness of the second layer of the anode is from 10 to 40 μm, for example, from 15 to 30 μm.

The third layer of the anode is the contact layer which comprises at least 85% by weight of nickel(II) oxide. The thickness of the third layer of the anode is 5-25 μm, for example, 10-20 μm. The contact layer optionally contains up to 15% by weight, usually from 2 to 15% by weight, or from 3 to 10% by weight, of a structure stabilizer which slows the coarsening of the nickel oxide. Suitable structure stabilizers are, for example, magnesium oxide, yttrium-doped zirconium oxide (in particular 8YSZ) and also cerium oxide powder doped with gadolinium(III) oxide (for example, cerium oxide powder doped with 5 mol % of gadolinium(III) oxide, 5GCO).

The cathode comprises two layers:

The first layer of the cathode can, for example, be an electrochemically active functional layer. It can comprise a mixture of lanthanum-strontium-manganese oxide (=LSM) and zirconium(IV) oxide, with the zirconium(IV) oxide being doped with 8-10 mol % of yttrium(III) oxide, based on the zirconium(IV) oxide. The proportion of lanthanum-strontium-manganese oxide (=LSM) based on the total mixture is 45-55% by weight. As an alternative to the zirconium(IV) oxide doped with 8-10 mol % of yttrium(III) oxide, it is possible to use a zirconium(IV) oxide doped with 4-10 mol % of ytterbium(III) oxide, for example, 7-10 mol % of ytterbium (III) oxide.

The second layer of the cathode is the cathode contact layer and comprises lanthanum-strontium-manganese oxide (=LSM). Its thickness is 25-50 μm.

In an embodiment, the present invention also provides a method to produce the electrolyte in which thin layers or sheets are firstly produced from a casting slip by tape casting which are then sintered to provide the electrolytes.

To produce a casting slip, use is made of, for example, 50% by weight of a zirconium(IV) oxide powder doped with 5 mol % of $Yb_2O_3$ and 50% by weight of a binder suspension, for example, the fully formulated binder suspension B-73208 supplied by FERRO.

The binder suspension FERRO B-73208 is placed in a cooled milling vessel and the 5YbSZ powder is stirred into the binder suspension by means of a high-speed stirrer so that a homogeneous mixture results. The high-speed stirrer was replaced in the next step by a basket mill filled with partially stabilized zirconium(IV) oxide milling beads. The slip mixture produced was milled in the basket mill until all agglomerates had been broken up. The milling action was controlled by a plurality of grindometer tests. The energy input was set so that the slip temperature did not exceed 35° C. The slip produced was then introduced into a clean 101 capacity ball mill container lined with polyamide in order to homogenize the slip further on a set of rollers. The ball mill was filled beforehand with 14.7 kg of partially stabilized zirconium(IV) oxide milling media. The slip was rolled on the set of rollers at 60 rpm for 48 hours.

The finished slip was filtered from the ball mill through a SPOTEX filter (150 μm) into the casting pressure vessel. The slip was then degassed while stirring at the same time. The degassed slip was cast on a tape casting machine from KEKO onto a carrier film in a thickness of 125 μm. The slip was filtered once more by means of a SPOTEX filter (75 μm) before being introduced into the casting shoe. Undispersed powder agglomerates and agglomerated binder constituents are removed by use of the filter, so that strength-reducing microstructural defects are minimized. The drying parameters were adapted during the course of the casting process so that the cast sheet became dry and was rolled up on a roll.

The sheet produced has the following properties:
tape density=3.36±0.02 g/cm³
maximum tensile strength=7.8±0.1 MPa
elongation at maximum tensile strength=43.0±0.8%
loss on ignition at 600° C. in air=17.4% by mass.

The sheet produced was cut into relatively large pieces from the roll. Round specimens for the measurements of the sintered density and the mechanical fracture strength carried out after sintering were cut from the pieces by laser cutting in the green state and square specimens for the measurements of the electrical conductivity carried out after sintering were cut from the pieces by laser cutting in the green state. The pieces of sheet were individually freed of binder and sintered between two setter plates.

The sintering temperature and time are to be selected so that firstly a very low porosity and secondly a very low grain growth are achieved, so that high conductivities and strengths as described above result. These conditions can be realized by use of a suitable zirconium(IV) oxide powder doped with ytterbium(III) oxide at a sintering temperature of from 1400 to 1550° C., for example, from 1400 to 1475° C., or from 1400 to 1445° C. The sintering time is generally from 15 to 600 min, for example, from 60 to 180 min, or from 60 to 120 min.

Specifically, at a sintering temperature of from 1475 to 1550° C., the sintering time can, for example, be selected to be in the range from 15 to 60 minutes, at a sintering temperature of from 1445° C. to 1475° C. the sintering time can, for example, be selected to be in the range from 60 to 180 minutes, while at a sintering temperature of from 1400° C. to 1445° C. the sintering time can, for example, be selected to be in the range from 120 to 600 minutes.

The influence of the sintering conditions on the sintered density, the conductivity and strength and the RoR fracture strength are shown in Tables 1 and 2.

The round specimens were then broken out from the sintered substrate and used for the measurements of the sintered density and the mechanical fracture strength. Defined narrow strips were sawn by means of a wafer saw from the square sintered substrates and their electrical conductivity was measured by the four-point DC method.

In the electrolytes having a doping of from 4.8 to 5.2 mol % of $Yb_2O_3$ produced according to the present invention, at least 98% of the grains have a diameter of less than 2 μm, for example, less than 1.6 μm, or less than 1.3 μm.

The further coating with the electrodes by screen printing was carried out using electrolytes having dimensions of 5 cm×5 cm.

To determine the flexural fracture strength of thin $Yb_2O_3$-doped zirconium(IV) oxide electrolytes, the cylinder bending fracture test was used. Here, electrolyte specimens having a length×width of 50 mm×7.7 mm and a thickness h of about 95 μm were bent around various plastic cylinders having decreasing diameters until the specimen could no longer be bent to a greater degree and fractured. This radius R was determined as maximum bending fracture radius and the maximum flexural fracture stress $\sigma^{max}_L$ was determined assuming an E modulus of the $Yb_2O_3$-doped zirconium(IV) oxide of E'=200 GPa, which corresponds to the typical value for $Y_2O_3$-doped zirconium(IV) oxide, according to the following formula:

$$\sigma^{max}_L(z) = E' \cdot \frac{h}{R}$$

In this way, the flexural fracture stresses of in each case 20 specimens from an electrolyte batch were determined and the values were plotted according to the Weibull distribution, so that the flexural fracture strength $\sigma_0$ and Weibull modulus m could be determined. As stressed volume, half of the strip volume V was assumed and the stress was converted into a value for a standard volume V' of 1 mm³ or typical electrolyte volumes for cell dimensions of 5 cm×5 cm and 10 cm×10 cm, where ζ and ζ' are the stresses at which the proportion F, here 63.2%, of the specimens break:

$$\varsigma'(F, V') = \left(\frac{V}{V'}\right)^{1/m} \cdot \varsigma(F, V)$$

To produce an electrolyte-supported cell from the sintered electrolytes, the various anode and cathode layers are applied by screen printing and subsequent cosintering.

To prevent warping due to the low thickness of the electrolyte and the different thermal expansion coefficients of the anode and cathode materials and of the electrolyte, the anode and cathode should be fired in a single sintering step so that good adhesion of anode and cathode results. Optimum power of the cell with good adhesion of the electrodes is, for example, achieved when firing of the electrodes takes place at a temperature of from 1175° C. to 1275° C., for example, from 1200° C. to 1250° C.

Table 1 indicates the relationship between the doping of the zirconium(IV) oxide with ytterbium(III) oxide, the sintering parameters, namely the sintering temperature and the hold time for which the material being sintered is held at the sintering temperature, and the conductivity at various operating temperatures. The ratio of the conductivity at 850° C. [S/m] to the doping with ytterbium(III) oxide [mol %] is a measure of the expected power of the fuel cell per molar amount of ytterbium(III) oxide used.

TABLE 1

Conductivity of the electrolyte as a function of the $Yb_2O_3$ concentration in the zirconium(IV) oxide

| Conc. of $Yb_2O_3$ [mol %] | Sintering time/ temperature | Conductivity at | | | Ratio of conductivity at 850° C. [S/m]/conc. of $Yb_2O_3$ [mol %] |
|---|---|---|---|---|---|
| | | 800° C. | 850° C. | 900° C. | |
| 4.12 | 30 min/1500° C. | 2.92 | 4.05 | 5.65 | 0.983 |
| 4.12 | 30 min/1530° C. | 2.92 | 4.14 | 5.77 | 1.005 |
| 4.12 | 1 h/1500° C. | 2.96 | 4.21 | 5.71 | 1.022 |
| 4.12 | 2 h/1475° C. | 2.92 | 4.17 | 5.73 | 1.012 |
| 4.12 | 4 h/1450° C. | 2.83 | 4.05 | 5.54 | 0.983 |
| 5.96 | 1 h/1500° C. | 4.8 | 6.85 | 9.3 | 1.149 |
| 5.96 | 1 h/1450° C. | 4.75 | 6.79 | 9.28 | 1.139 |

Table 2 shows the influence of the sintering conditions on the properties of zirconium(IV) oxide doped with 4.96 mol % of $Yb_2O_3$ (sintering temperature in degrees Celsius; hold time for which the electrolyte material to be sintered is held at the sintering temperature, in minutes; and rate of temperature increase in kelvin/hour) on the materials properties, i.e., the sintered density, the specific electrical conductivity and the mechanical strength, which is reported as Weibull modulus$_{mk}$ and as σ (RoR)$_0$.

TABLE 2

| Seq. No. | Sintering conditions | | | Sintered density [g/cm³] | Weibull modulus$_{mk}$ | | | Strength σ (RoR)$_0$ in accordance with EN 1288-2 | | | Electrical conductivity at 850° C. [S/m] | Ratio of conductivity at 850° C. [S/m]/conc. of Yb$_2$O$_3$ [mol %] |
|---|---|---|---|---|---|---|---|---|---|---|---|---|
| | temp. [° C.] | time [min] | rate [K/h] | | | | | | | | | |
| 1 | 1400 | 15 | 60 | 6.438 ± 0.008 | 6.1 | +2.3 | −1.4 | 916 | +52 | −49 | 5.07 ± 0.07 | 1.022 |
| 2 | 1475 | 60 | 120 | 6.458 ± 0.010 | 6.0 | +2.2 | −1.3 | 858 | +38 | −37 | 5.40 ± 0.02 | 1.089 |
| 3 | 1550 | 105 | 180 | 6.456 ± 0.006 | 7.4 | +2.7 | −2.0 | 774 | +45 | −42 | 5.19 ± 0.03 | 1.044 |
| 4 | 1475 | 60 | 120 | 6.455 ± 0.007 | 7.2 | +2.6 | −1.6 | 842 | +41 | −39 | 5.22 ± 0.04 | 1.052 |
| 5 | 1400 | 105 | 180 | 6.446 ± 0.009 | 7.1 | +2.6 | −1.6 | 966 | +85 | −75 | 5.16 ± 0.07 | 1.040 |
| 6 | 1550 | 105 | 60 | 6.459 ± 0.003 | 4.6 | +1.7 | −1.1 | 785 | +44 | −42 | 5.26 ± 0.03 | 1.060 |
| 7 | 1400 | 15 | 180 | 6.418 ± 0.009 | 6.0 | +2.3 | −1.4 | 851 | +42 | −39 | 4.99 ± 0.03 | 1.006 |
| 8 | 1550 | 15 | 180 | 6.462 ± 0.004 | 4.7 | +1.7 | −1.1 | 801 | +38 | −36 | 5.30 ± 0.01 | 1.069 |
| 9 | 1550 | 15 | 60 | 6.461 ± 0.006 | 5.6 | +2.1 | −1.3 | 843 | +32 | −30 | 5.35 ± 0.04 | 1.079 |
| 10 | 1400 | 105 | 60 | 6.452 ± 0.006 | 5.7 | +2.1 | −1.3 | 967 | +44 | −42 | 5.27 ± 0.04 | 1.063 |
| 11 | 1475 | 60 | 120 | 6.460 ± 0.003 | 7.1 | +2.6 | −1.6 | 915 | +39 | −37 | 5.34 ± 0.02 | 1.077 |
| 12 | 1400 | 120 | 60 | | 4.5 | +1.6 | −1.1 | 717 | +51 | −47 | 5.31 ± 0.00 | 1.071 |
| 13 | 1425 | 120 | 60 | | 5.6 | +2.1 | −1.3 | 722 | +39 | −37 | 5.37 ± 0.00 | 1.083 |
| 14 | 1400 | 180 | 60 | | 4.1 | +1.5 | −1.0 | 735 | +46 | −43 | 5.43 ± 0.00 | 1.095 |
| 15 | 1410 | 156 | 60 | | 4.7 | +1.7 | −1.1 | 715 | +42 | −40 | 5.32 ± 0.00 | 1.073 |
| 16 | 1425 | 180 | 60 | | 4.2 | +1.6 | −1.0 | 758 | +37 | −35 | 5.44 ± 0.00 | 1.097 |

Figure 3:
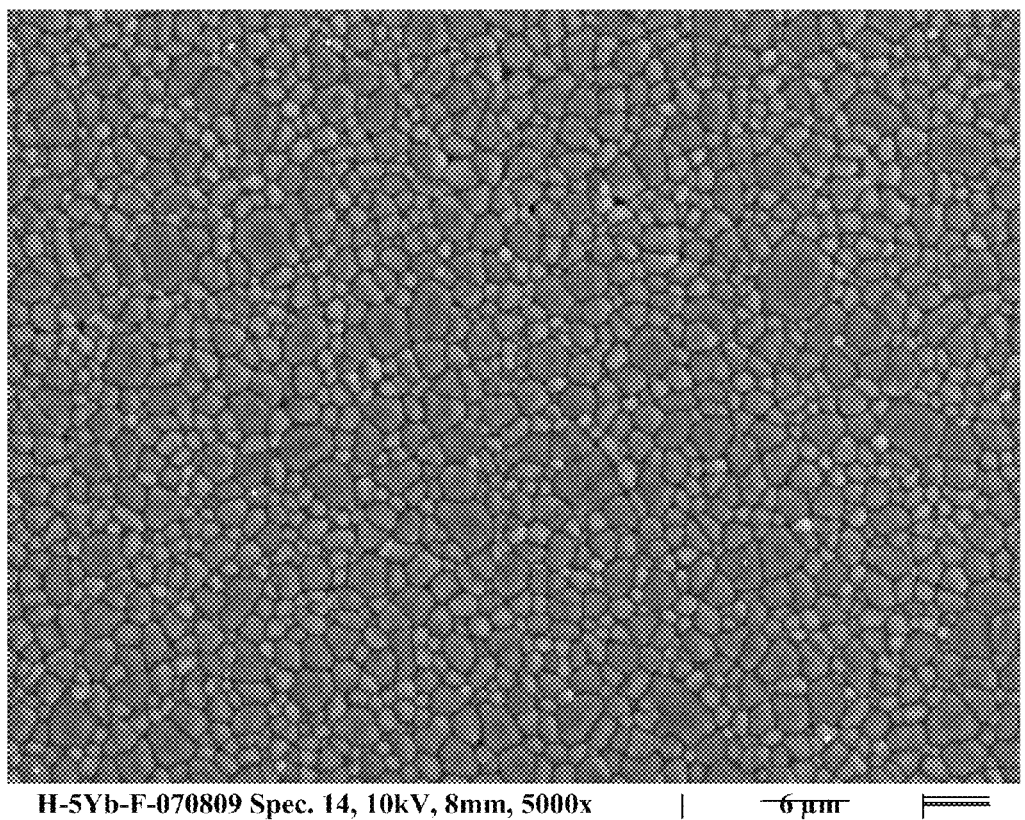
FIGS. 3-7 show electron micrographs of a thermally etched polished section of a sintered electrolyte layer containing 5YbSZ.
Figure 4:
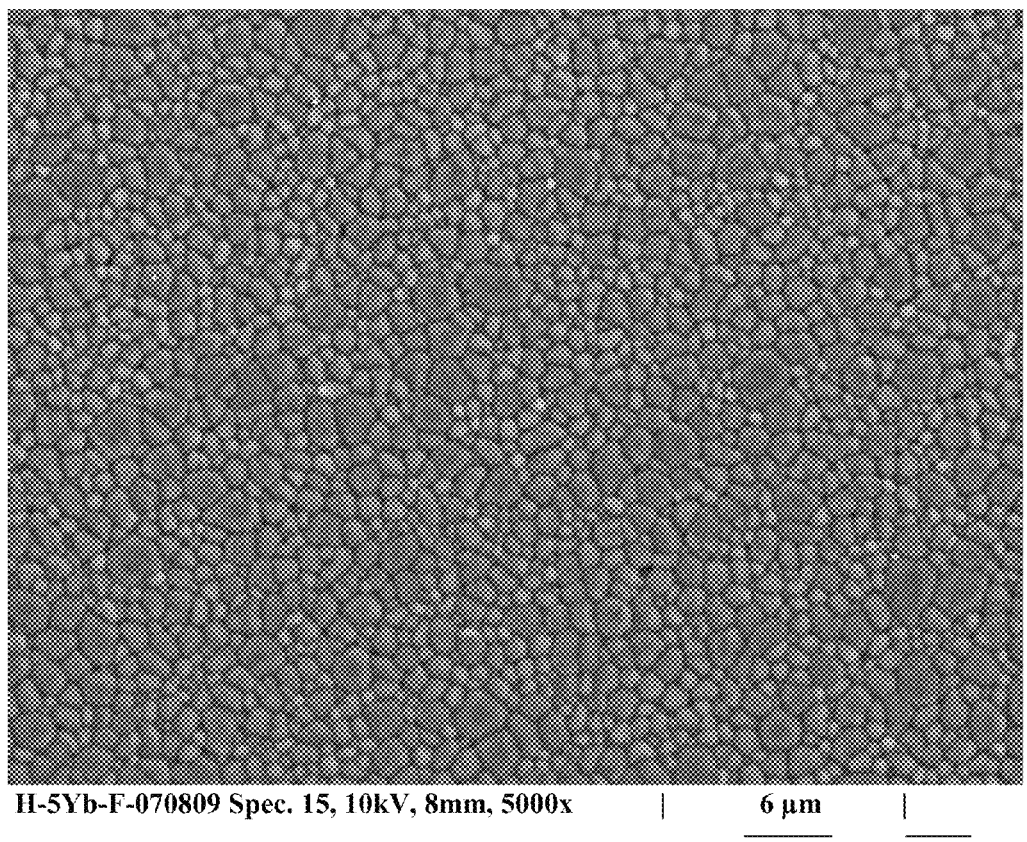
Figure 5:
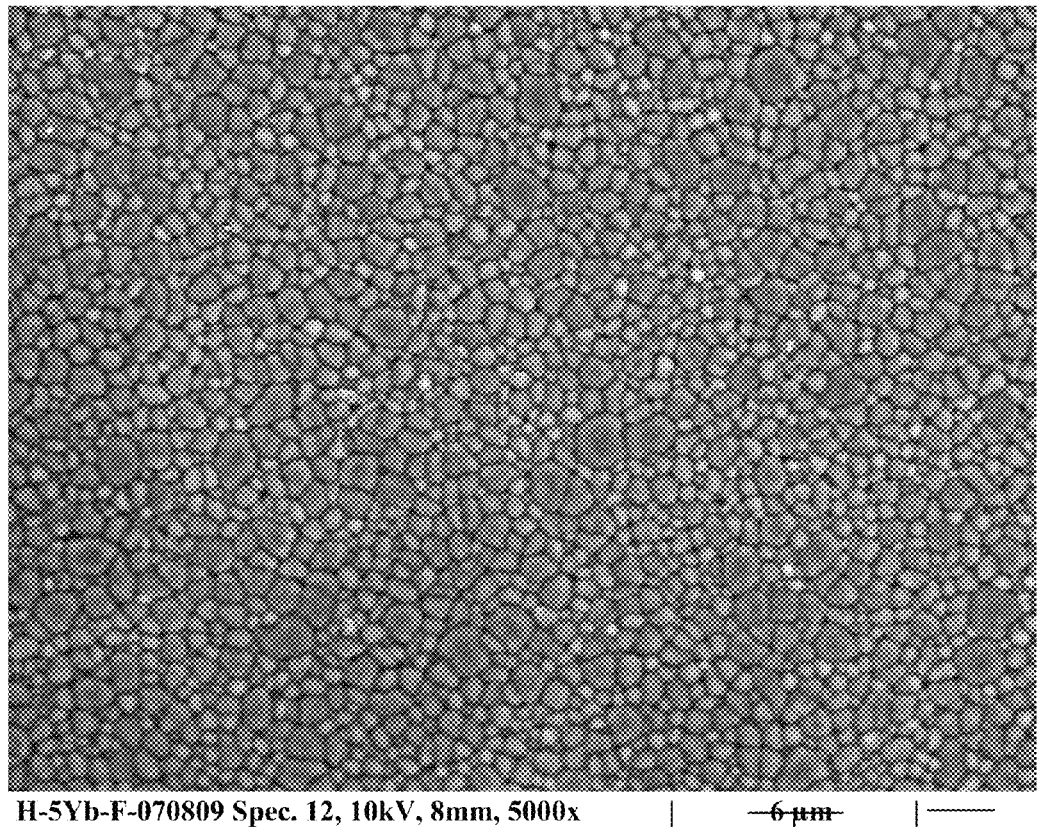
Figure 6:
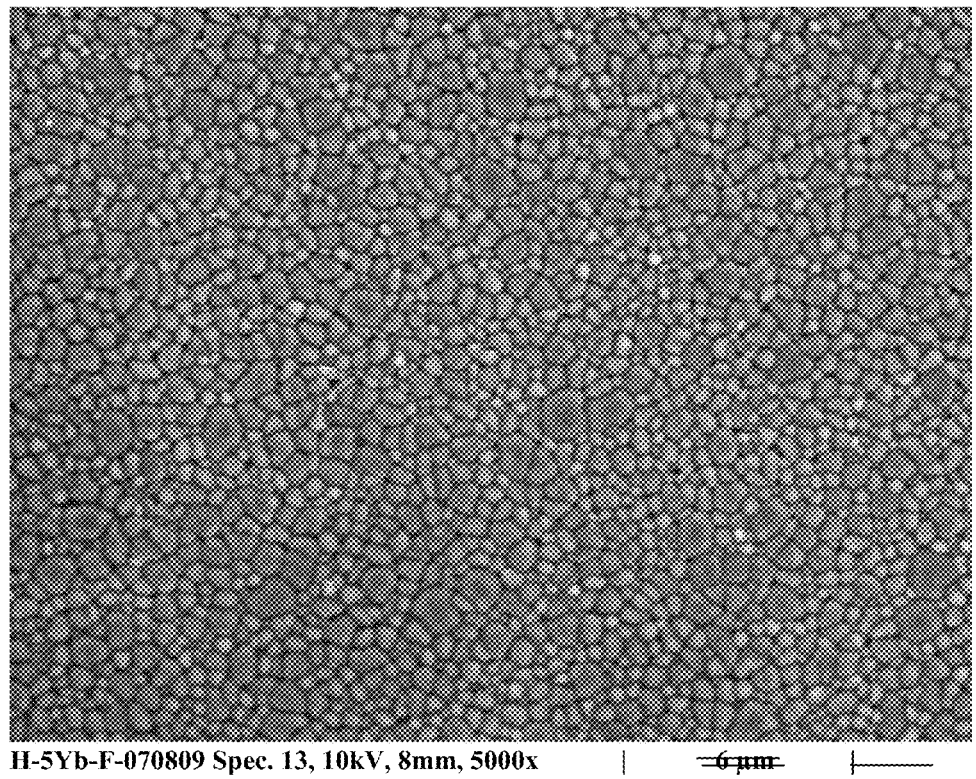
Figure 7:
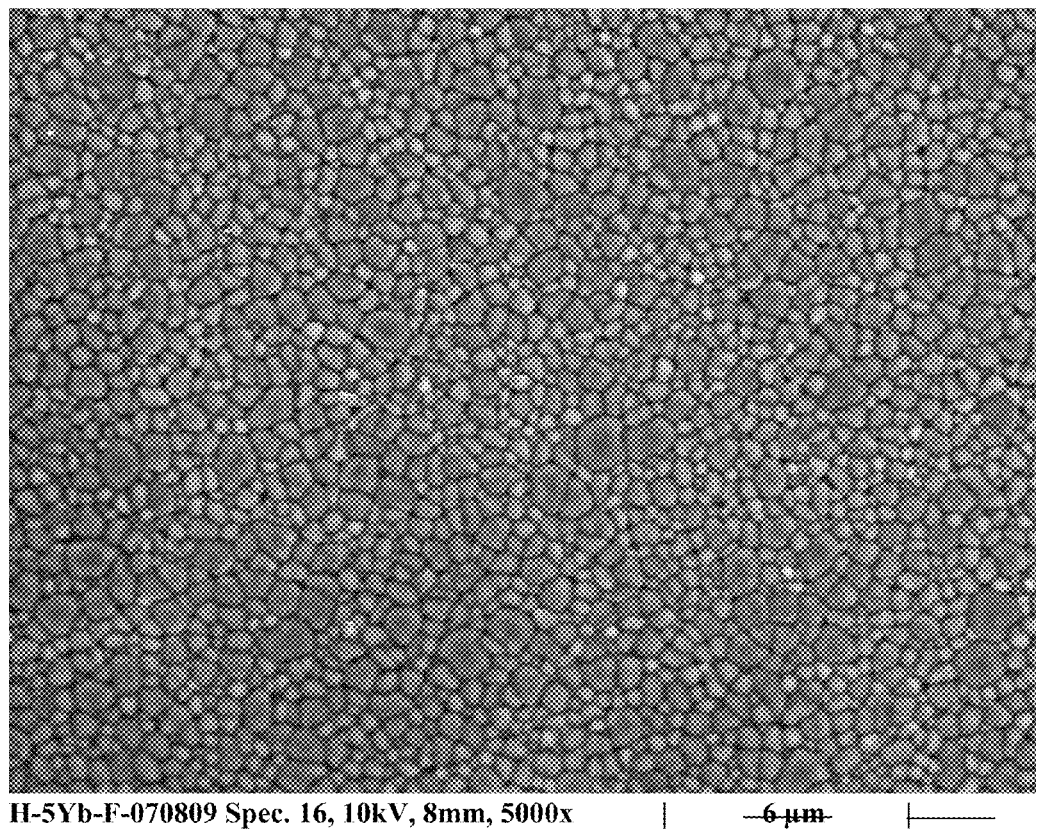

In Table 2, the sequential number 14 corresponds to FIG. 3; the sequential number 15 corresponds to FIG. 4; the sequential number 12 corresponds to FIG. 5; the sequential number 13 corresponds to FIG. 6; and the sequential number 16 corresponds to FIG. 7.

Production of a Screen Printing Paste for the Anode Bonding Layer

50% by weight of cerium oxide powder doped with 20 mol % of $Gd_2O_3$, for example, from Praxair, which can additionally contain from 1 to 2% by weight of cobalt oxide, and 50% by weight of a binder consisting essentially of ethylcellulose and terpineol were combined in a milling vessel, deagglomerated in a bead mill and subsequently homogenized on a roll mill to give a very fine paste. The paste was printed using a very fine screen so that the dried layer had a thickness of about 5 μm.

Production of a Screen Printing Paste for the Anode Functional Layer

63% by weight of a mixture of 65% by weight of NiO and 35% by weight of a cerium oxide powder doped with 5 mol % of $Gd_2O_3$, as supplied by Praxair, and 37% by weight of a binder consisting essentially of ethylcellulose and terpineol, were combined in a kneader vessel and subsequently homogenized on a roll mill to give a paste. The paste was printed using a medium-fine screen so that the dried layer had a thickness of about 30 μm.

Production of a Screen Printing Paste for the Anode Contact Layer

A paste was produced on a roll mill from 63% by weight of a mixture comprising 95% by weight of NiO powder and 5% by weight of cerium oxide powder doped with 5 mol % of gadolinium(III) oxide and 37% by weight of a binder consisting essentially of ethylcellulose and terpineol. The paste was printed using a medium-fine screen so that the dried layer had a thickness of about 15 μm.

Production of a Paste for a Cathode Functional Layer

A paste was produced on a roll mill from 60% by weight of a mixture comprising 50% by weight of lanthanum-strontium manganite powder, as supplied by H. C. Starck, and 50% by weight of 8YSZ, as supplied by Tosoh, and 40% by weight of a binder consisting essentially of ethylcellulose and terpineol. The paste was printed using a coarse screen so that the dried layer had a thickness of about 30 μm.

Production of a Paste for a Cathode Contact Layer

A paste was produced on a roll mill from 60% by weight of lanthanum-strontium manganite powder, as supplied by H. C. Starck, and 40% by weight of a binder consisting essentially of ethylcellulose and terpineol. The paste was printed using a coarse screen so that the dried layer had a thickness of about 30 μm.

All the following examples of cells provided with electrolytes according to the present invention and of 3YSZ electrolytes according to the prior art were produced using pastes made by the above-described procedure. The three anode layers and then the two cathode layers were first printed in a size of 4 cm×4 cm. In the following examples, the electrolyte substrates and cosintering conditions were varied.

A current-voltage curve is recorded on the cells in a special aluminium-oxide housing using a fuel gas mixture of 50% of hydrogen and 50% of water at 850° C. The fuel gas flow to the anode was 20 standard liters/hour; 40 standard liters/hour of air were supplied to the cathode. The gradient of the voltage-current density curve corresponds to the specific area resistance of the cell.

Planar fuel cell stacks can be produced from the electrolyte-supported planar fuel cells based on the electrolytes according to the present invention and interconnects composed of ferritic Fe—Cr alloys, for example, Crofer® 22 APU from ThysenKrupp, VDM or ITM from Plansee, typically containing 18-25% of chromium and having a TEC which is typically in the range from $11.5 \times 10^{-6}$ K$^{-1}$ to $12.5 \times 10^{-6}$ K$^{-1}$, in the manner described in the prior art, for example, in WO 2005/011 040 A2 or in WO 2005/013 390 A2. The use of electrolyte-supported cells having high power and a high mechanical strength and based on an electrolyte according to the present invention is preferable compared to the prior art, namely the use of cells based on 3YSZ electrolytes.

EXAMPLES

Example 1

An electrolyte according to the present invention which comprised a 75 μm thick layer of zirconium(IV) oxide doped with 5.96 mol % of $Yb_2O_3$ which was sintered at 1500° C. for 30 minutes and had a strength of about 800 MPa (strips in the cylinder bend fracture test) and a ratio of conductivity to dopant concentration of 1.11 was coated in the above-described manner with the above-described electrode pastes and fired at 1200° C. This resulted in a cell having an area resistance of 0.28 $\Omega cm^2$. The results are shown in FIG. 8.

Example 2

An electrolyte according to the present invention which comprised a 54 μm thick layer of zirconium(IV) oxide doped with 4.12 mol % of $Yb_2O_3$ which was sintered at 1500° C. for 60 minutes and had a strength of about 1240 MPa (strips in the cylinder bend fracture test) and a ratio of conductivity to dopant concentration of 1.02 was coated in the above-described manner with the above-described electrode pastes and fired at 1200° C. This resulted in a cell having an area resistance of 0.31 $\Omega cm^2$. The results are shown in FIG. 8.

Example 3

The starting material was an electrolyte layer according to the present invention which comprised an 89 μm thick layer of zirconium(IV) oxide doped with 4.96 mol % of $Yb_2O_3$ which had been sintered at 1500° C. for 60 minutes and had a strength of about 1040 MPa (strips in the cylinder bend fracture test) and a ratio of conductivity to dopant concentration of 1.06. In addition, at least 98% of the grains of the electrolyte layer had a maximum diameter of 1.8 μm. The electrolyte layer was coated in the above-described manner with the above-described electrode pastes and fired at 1200° C. A cell having an area resistance of 0.32 $\Omega cm^2$ resulted. The results are shown in FIG. 10.

Example 4

The starting material was an electrolyte layer according to the present invention which comprised a 91 μm thick layer of zirconium(IV) oxide doped with 4.96 mol % of $Yb_2O_3$ which had been sintered at 1500° C. for 60 minutes and had a strength of about 1040 MPa (strips in the cylinder bending fracture test) and a ratio of conductivity to dopant concentration of 1.06. In addition, at least 98% of the grains of the electrolyte layer had a maximum diameter of 1.8 μm. The electrolyte layer was then coated in the above-described manner with the above-described electrode pastes and fired at 1250° C. A cell having an area resistance of 0.36 $\Omega cm^2$ resulted. The results are shown in FIG. 11.

Prior Art Comparative Example 1

An electrolyte layer corresponding to the prior art which comprised a 90 μm thick layer of zirconium(IV) oxide doped with 3 mol % of $Y_2O_3$ which had been sintered at 1500° C. for 60 minutes and had a strength of about 1440 MPa (strips in the cylinder bending fracture test) was coated in the above-described manner with the above-described electrode pastes and fired at 1200° C. A cell having an area resistance of 0.49 $\Omega cm^2$ resulted. The results are shown in FIG. 12.

Prior Art Comparative Example 2

An electrolyte layer corresponding to the prior art which comprised a 90 μm thick layer of zirconium(IV) oxide doped with 3 mol % of $Y_2O_3$ which had been sintered at 1500° C. for 60 minutes and had a strength of about 1440 MPa (strips in the cylinder bending fracture test) was coated in the above-described manner with the above-described electrode pastes and fired at 1250° C. A cell having an area resistance of 0.53 $\Omega cm^2$ resulted. The results are shown in FIG. 13.

The present invention is not limited to embodiments described herein; reference should be had to the appended claims.

The invention claimed is:

1. Electrolyte for an electrolyte-supported high-temperature fuel cell, the electrolyte comprising:
    zirconium(IV) oxide doped with from 3.5 mol % to 6.5 mol % of ytterbium(III) oxide, the electrolyte having a thermal expansion coefficient (TEC) based on 30° C. of from $10.6*10^{-6} K^{-1}$ to $11.1*10^{-6} K^{-1}$ at 800° C.,
    wherein,
    the electrolyte is produced by a method which includes a step of sintering at a sintering temperature of from 1410° C. to 1550° C. for 15 to 60 minutes, and
    the electrolyte is provided as a layer with a thickness of from 50 μm to 150 μm.

2. The electrolyte as recited in claim 1, wherein the electrolyte is doped with from 4.6 mol % to 5.5 mol % of ytterbium(III) oxide, and wherein, after a sintering of the electrolyte, at least 98% of zirconium(IV) oxide grains have a visible diameter in a thermally etched polished section of an electron micrograph of less than or equal to 2.0 μm.

3. The electrolyte as recited in claim 2, wherein the electrolyte is doped with from 4.8 mol % to 5.2 mol % of ytterbium(III) oxide.

4. The electrolyte as recited in claim 1, wherein the electrolyte is provided as a layer with a thickness of from 50 μm to 150 μm having a mechanical strength of at least one of more than 700 MPa as determined by a double ring measurement method of an EN 1288-2 norm and more than 800 MPa as determined by a cylinder bending fracture test, as based on a volume under tension of an electrolyte strip having dimensions of 50 mm×7.7 mm×0.090 mm.

5. The electrolyte as recited in claim 1, wherein a ratio of a specific conductivity of the electrolyte at 850° C. measured in Siemens/meter (S/m) to a concentration of the doping of the zirconium(IV) oxide with ytterbium(III) oxide measured in mol % exceeds 1.0 S/(m mol %).

6. An electrolyte-supported fuel cell comprising:
    an electrolyte comprising zirconium(IV) oxide doped with from 3.5 to 6.5 mol % of ytterbium(III) oxide, the electrolyte having a thermal expansion coefficient (TEC) based on 30° C. of from $10.6*10^{-6} K^{-1}$ to $11.1*10^{-6} K^{-1}$ at 800° C.,
    wherein,
    a specific area resistance of the electrolyte-supported fuel cell is 0.4 $\Omega cm^2$, the electrolyte is produced by a method which includes a step of sintering at a sintering temperature of from 1410° C. to 1550° C. for 15 to 60 minutes, and the electrolyte is provided as a layer with a thickness of from 50 μm to 150 μm.

7. A method of producing an electrolyte comprising zirconium(IV) oxide doped with from 3.5 to 6.5 mol % of ytterbium(III) oxide, the electrolyte having a thermal expansion coefficient (TEC) based on 30° C. of from $10.6*10^{-6} K^{-1}$ to $11.1*10^{-6} K^{-1}$ at 800° C., the method comprising:

casting the electrolyte as an electrolyte sheet so as to provide a layer with a thickness of from 50 µm to 150 µm; and sintering the electrolyte sheet at a sintering temperature of from 1410° C. to 1550° C. for a sintering time of from 15 minutes to 600 minutes.

8. The method as recited in claim 7, wherein the sintering temperature is from 1475° C. to 1550° C. and the sintering time is from 15 minutes to 60 minutes.

9. The method as recited in claim 7, wherein the sintering temperature is from 1445° C. to 1475° C. and the sintering time is from 60 minutes to 180 minutes.

10. The method as recited in claim 7, wherein the sintering temperature is from 1400° C. to 1445° C. and the sintering time is from 120 minutes to 600 minutes.

11. Method of using an electrolyte comprising zirconium (IV) oxide doped with from 3.5 to 6.5 mol % of ytterbium(III) oxide, the electrolyte having a thermal expansion coefficient (TEC) based on 30° C. of from $10.6*10^{-6}$ $K^{-1}$ to $11.1*10^{-6}$ $K^{-1}$ at 800° C. and a thickness of from 50 µm to 150 µm, in an electrolyte-supported fuel cell, the method comprising:

providing the electrolyte by a method which includes a step of sintering at a sintering temperature of from 1410° C. to 1550° C.; and incorporating the electrolyte in the electrolyte-supported fuel cell.

12. The method as recited in claim 11, further comprising:

providing a plurality of the electrolyte in the electrolyte-supported fuel cell; and arranging the plurality of the electrolyte in the electrolyte-supported fuel cell so as to provide a fuel cell stack, wherein the fuel cell stack comprises interconnects having a thermal expansion coefficient of from $11.5*10^{-6}$ $K^{-1}$ to $12.5*10^{-6}$ $K^{-1}$.

* * * * *